United States Patent [19]

Fabre et al.

[11] Patent Number: 5,121,462
[45] Date of Patent: Jun. 9, 1992

[54] PROCESS FOR PRODUCTION OF SCINTILLATING OPTICAL FIBERS AND OPTICAL FIBERS OBTAINED

[75] Inventors: Jean-Paul Fabre, Divonne; Heinrich Leutz, Gex; Pierre Destruel, Toulouse; Jean Farenc, Saint-Orens; Michel Taufer; Didier Puertolas, both of Toulouse, all of France

[73] Assignees: Centre National de la Recherche Scientifique, Paris, France; Organisation Europeene pour la Recheshe Nucleaire, Geneva, Switzerland

[21] Appl. No.: 582,970

[22] PCT Filed: Jan. 26, 1990

[86] PCT No.: PCT/FR90/00074

§ 371 Date: Sep. 28, 1990

§ 102(e) Date: Sep. 28, 1990

[87] PCT Pub. No.: WO90/08644

PCT Pub. Date: Aug. 9, 1990

[30] Foreign Application Priority Data

Jan. 31, 1989 [FR] France ................. 89 01327

[51] Int. Cl.⁵ .................................. G02B 6/00
[52] U.S. Cl. ......................... 385/143; 264/1.5
[58] Field of Search ............. 350/96.10, 96.29, 96.30, 350/96.34; 264/1.5; 524/718, 719, 720

[56] References Cited

U.S. PATENT DOCUMENTS

| | | | |
|---|---|---|---|
| 3,553,466 | 1/1971 | Johnston et al. | 350/96.1 |
| 4,552,431 | 11/1985 | Allemand et al. | 350/96.34 |
| 4,788,436 | 11/1988 | Koechner | 350/485.1 |
| 4,790,619 | 12/1988 | Lines et al. | 350/96.16 |
| 4,812,013 | 3/1989 | Aurouet et al. | 350/96.29 |
| 4,867,919 | 9/1989 | Yafuso et al. | 264/1.5 |

FOREIGN PATENT DOCUMENTS 240106 10/1987 European Pat. Off. .
269223 6/1988 European Pat. Off. .
2531495 1/1977 Fed. Rep. of Germany .
2533709 3/1984 France .

OTHER PUBLICATIONS

H. Gusten et al., *Journal of Photochemistry*, vol. 21, 1983, Elsevier Sequoia, (CH), "Influence of Restricted Intramolecular Motions on the Fluorescence Quantum Yield of Fluorophores", pp. 53–60.

K. Zhao et al., *Chemical Abstracts*, vol. 109, 1988, "Use of a New Scintillator PMP for counting Alpha-Emitters", p. 599.

H. Guesten et al., *Chemical Abstracts*, vol. 93, 1980, "Novel Primary Solutes for Liquid Scintillation Counting", p. 527.

H. Guesten et al., *Chemical Abstracts*, vol. 88, 1978, "Organic Scintillators With Unusually Large Stokes Shifts", p. 488.

P. Destruel et al., *Chemical Abstracts*, vol. 110, 1989, "A New Plastic Scintillator With Large Stokes Shift", p. 530.

M. Boven et al., *Chemical Abstracts*, vol. 110, 1989, "A New Radiation-Hard Plastic Scintillator", p. 541.

Japanese Patent Gazette, week 8842, section CH, class A, Nr. 88-295423 (42), Derwent Publications, Ltd., Londres, GB.

*Primary Examiner*—Frank Gonzalez
*Attorney, Agent, or Firm*—Harold H. Dutton, Jr.

[57] ABSTRACT

A process for producing scintillating optical fibres consisting in dissolving in a monomer having aromatic cycles, in particular vinyltoluene or styrene, 1-phenyl-3-mesityl-2-pyrazolin (PMP) doping molecules and a chain transfer agent, especially glycoldimercapto acetate, in heating the mixture so as to cause it to polymerize and to effect the final sheathing and stretching of the polymer so as to produce the optical fibres. The process of the invention enables fibres to be obtained which have a very small diameter (in the region of 30 to 50 microns) with a reduced molar extinction in a proportion exceeding 100 in relation to conventional scintillating fibres; it also totally suppresses diaphotic phenomena when the fibres are arranged to form a beam.

12 Claims, 3 Drawing Sheets

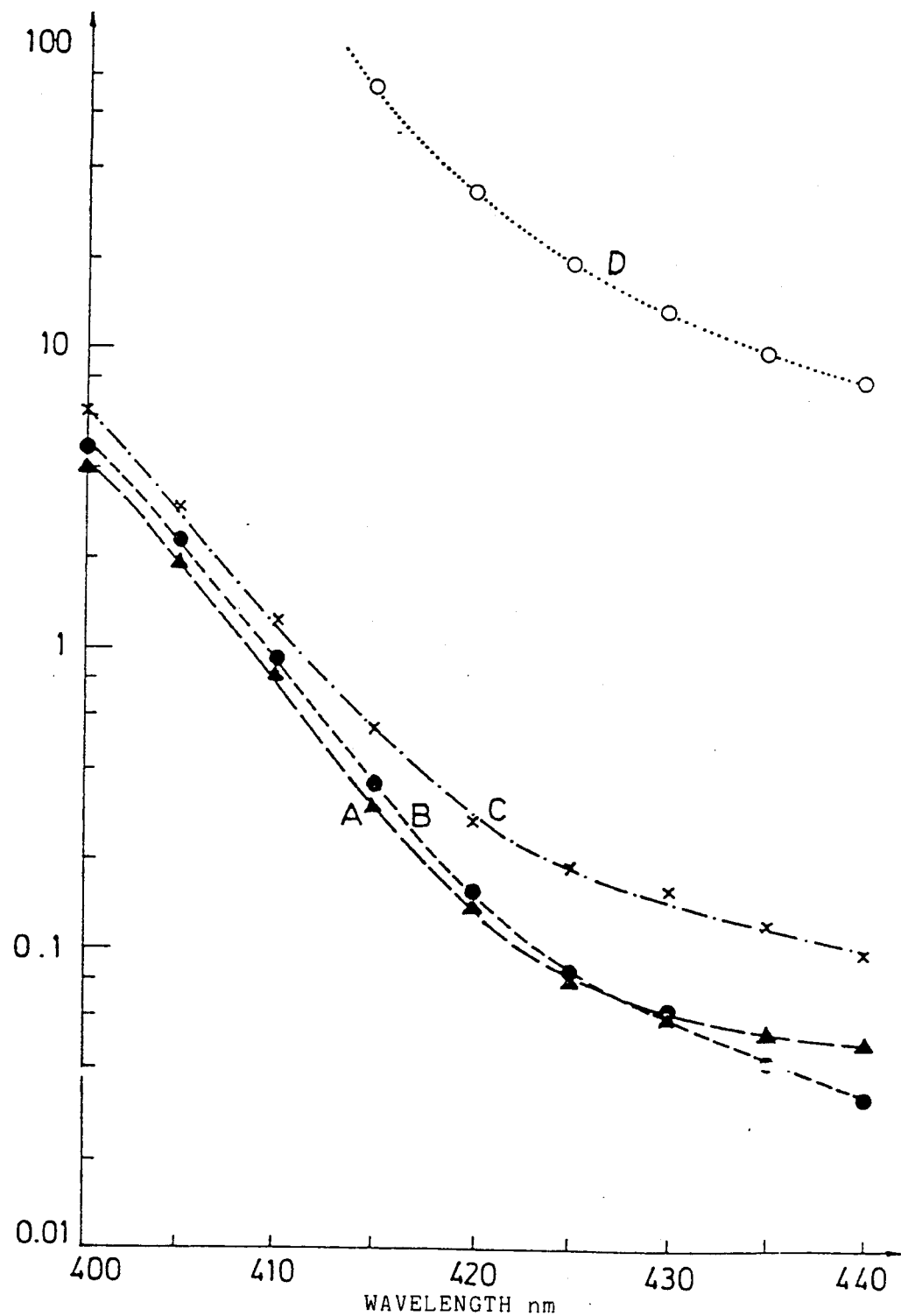

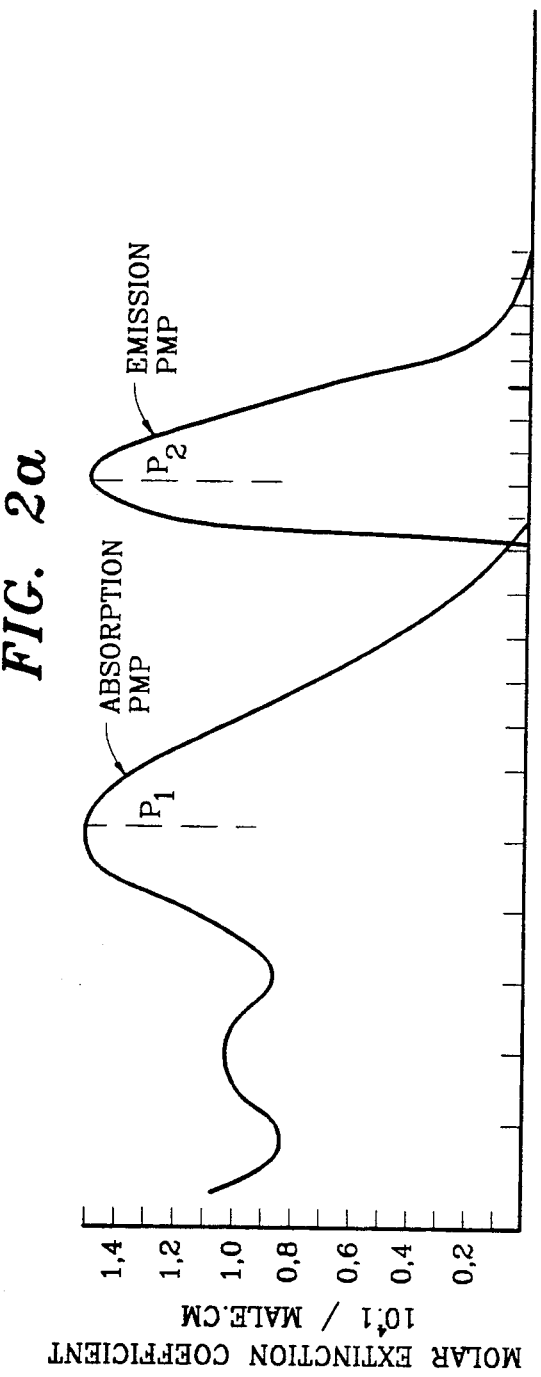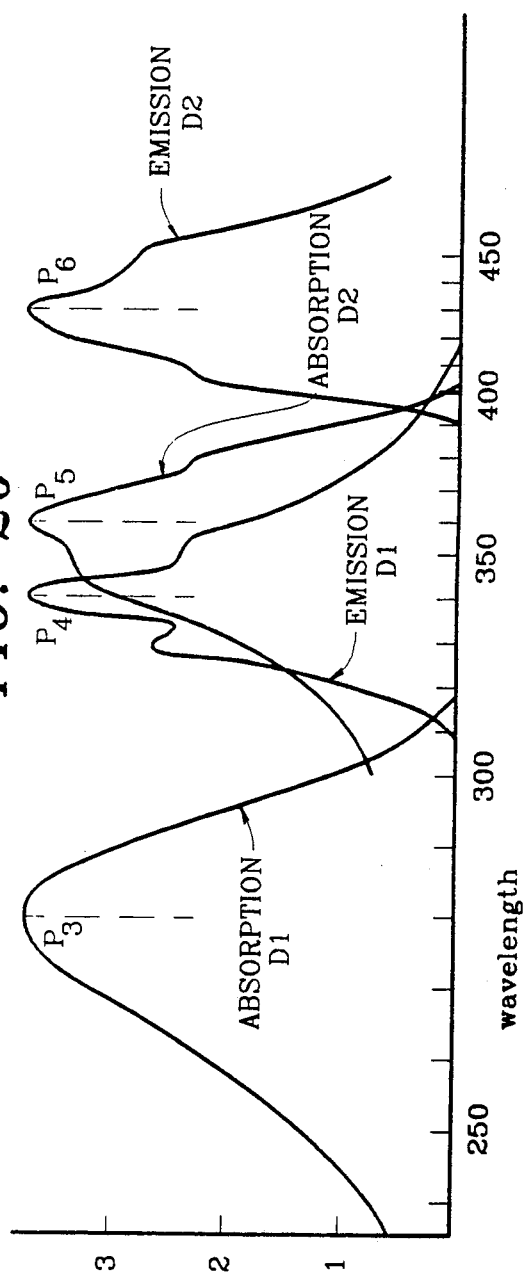

PROCESS FOR PRODUCTION OF SCINTILLATING OPTICAL FIBERS AND OPTICAL FIBERS OBTAINED

The invention relates to a process for the production of scintillating optical fibers of the type having a core of a polymer of aromatic rings doped by molecules characterized by a Stokes shift. The invention also relates to new optical fibers produced by the process.

Scintillating optical fibers are known which are particularly used for detecting high energy particles. Currently, these fibers are produced by dissolving two dopants into a core monomer to be polymerized:

one dopant for the capture of the energy of excitation, able to re-emit the energy in the form of photons of an intermediate wavelength, generally of PBD (2-phenyl-5(4-biphenylyl)-1,3,4-oxadiazole), or butyl PBD, of p-tertiaryphenyl PBD, the other dopant for shifting toward the visible range, able to absorb these intermediate photons for re-emitting them in the visible range, generally of POPOP: (1,4-di-2-(5-phenyloxazolyl)-benzene) or of bis-MSB: (p-bis(o-methylstyryl)benzene).

However, this production and doping technique, which is presently the only one known for producing scintillating optical fibers, has three essential drawbacks.

In the first place, it does not permit production of fibers of very small diameter and the fibers obtained have in practice had a diameter greater than or equal to 500 microns. This limitation stems from the combination of two factors, one related to the ratio of the energy of the conducted light to the energy of excitation, which becomes very low for these known fibers at a diameter of 500 microns, the other residing in the drawing difficulties encountered below this diameter. As a consequence, fibers of very small diameter which have been obtained during tests using the aforementioned known technique are of poor quality, unlikely to be used as particle detectors in accelerations of the linear acceleration type, synchrotron, or in medical apparatus. The reduction of the diameter of fibers to diameters on the order of 30 to 50 microns has proven essential, either for providing particle detectors, of an acceptable size, adapted to projection accelerators which tend to excite greater and greater energy bundles, or for increasing the resolution of the known detectors particularly in the medical field.

Further, scintillating optical fibers produced by the known technique have an attenuation length which in practice is less than 2 meters, that is, beyond this length, the ratio of the quantity of light emitted from the end of the fiber to the quantity of light produced at the site by the excitation energy becomes too weak for practical use. This limit shows up in particular in the molar extinction coefficient of the material of these fibers which is on the order of 20 to 30 liters/mole.cm at 420 nm.

Finally, the known fibers used in bundles in detectors require the presence of a supplemental opaque sheath around each fiber for suppressing 'diaphotic' phenomena, consisting in a delocalization of the light from the excited fiber toward the adjacent fibers, which reduces the resolution of the detector. The need for this supplemental opaque sheath increases the cost of the production process, while its burdensome nature is prejudicial to the performances of the bundles of fibers and thus of the detector.

Existing scintillating fibers and their technique for production have serious limitations, for which there is no currently known solution.

The present invention proposes to overcome the aforementioned drawbacks and to provide a solution permitting the production of scintillating optical fibers of a polymer susceptible of having diameters much lower than those of known fibers and benefitting from increased attenuation lengths, regardless of the diameter of said fibers.

One object is in particular to enable the production of quality fibers having diameters on the order of 30 to 50 microns.

Another object is in particular to permit a very significant reduction of the molar extinction coefficient of the core material of the fibers, a reduction in a ratio greater than 100.

Another object is to suppress completely the diaphotic phenomena in the case of bundles of fibers, and this, in the absence of a supplemental opaque sheath.

To this end, the production process provided by the invention is of the type comprising using a core monomer having aromatic rings, in particular vinyltoluene or styrene, dissolving in said monomer doping molecules having a Stokes shift, heating the mixture for causing it to polymerize producing a core polymer and carrying out an operation of depositing on the surface a sheath material having an index of refraction less than that of the core polymer, and carrying out a drawing operation on said polymer for producing the optical fiber; the process according to the present invention is characterized in:

dissolving in the core monomer doping molecules of 1-phenyl-3-mesityl-2-pyrazoline (PMP) having a Stokes shift characteristic of an absorption of ultraviolet light with a peak at 295 nm (measured in cyclohexane solution), and a re-emission in the visible range with a peak at 410 nm (measured in cyclohexane solution), said dissolution being carried out for obtaining a mixture of a concentration comprising between 0.005 and 0.2 mole of PMP per liter of monomer:

adding to the core monomer or to the mixture a chain transfer agent in such a manner as to limit during polymerization the molecular mass of the core polymer obtained to values between 80,000 and 600,000.

Tests carried out have shown that the production process according to the invention permits producing scintillating optical fibers the diameter of which may go as low as 30 microns (and eventually even lower according to the drawing process used). In the case of small diameter fibers, the ratio of energy of the conducted light to the energy of excitation remains good and acceptable for uses in the field of particle detectors; further, no particular drawing difficulty has been observed and the process leads to good quality fibers. In addition, the molar coefficient of extinction of the core material of the fibers is on the order of 0.1 to 420 nanometers, that is on the order of 300 to 500 times less than that of known materials. Further, it has been observed that in a bundle, the fibers obtained by the process of the invention do not give rise to any diaphotic phenomena, which permits using them without an opaque sheath.

Detailed explanations on these performances will be provided below with reference to the accompanying drawings.

According to a preferred embodiment providing an optimum compromise between the quantitative yield of the core material (ratio of the emission of light to the incident stimulus) and its transparency (aptitude to transmit the emitted light), the PMP is dissolved in the core monomer in order to obtain a mixture of a concentration comprising between 0.01 and 0.05 moles of PMP per liter of monomer.

In addition, the polymerization is preferably carried out by heating the mixture in two steps, to a first step between 90° C. and 110° C. for a period adapted to achieve a degree of polymerization equal to at least 80%, and then to a second step of between 130° C. and 150° C. to obtain a degree of polymerization greater than 99.5%. This procedure permits assuring a better control of the chemical reaction (no thermal imbalance, increased homogeneity in the stated range of molecular mass), and therefor improve even further the quality of the fibers.

Moreover, the process is advantageously carried out under the following conditions, permitting obtaining cylindrical fibers free of bubbles in the core material:

the mixture is caused to polymerize in a cylindrical ampule in order to obtain a bar after polymerization, said bar is cooled at a speed of cooling less than 0.15° C. per minute to ambient temperature, the drawing operation is carried out after having reheated the bar to the softening point.

Preferably the cooling will be achieved in several stages having cooling speeds decreasing in proportion to the approaching of the glass transition temperature of the core polymer, the cooling speed for passing this temperature being less than 0.05° C./min. Any formation of bubbles or microbubbles is thus avoided in the core material.

The sheath material used is preferably constituted by a fluorinated acrylic sheath monomer, which leads to a polymer having an index of refraction less than 1.42, with good thermal properties and able to be drawn under the same conditions as the core polymer. This sheath monomer is arranged on the surface of the bar of the core polymer and is caused to polymerize around said bar either by photopolymerization or by thermal polymerization, the composite then being reheated and drawn in order to obtain the fiber.

Additionally, to increase the life of the fibers, there is preferably added to the monomer of the core material or to the mixture, an antioxidant product adapted to limit the oxidation phenomena of the core polymer and of the PMP; these antioxidants themselves are well known and for example, $\alpha$ or $\beta$ phenylnaphthylamine may be used.

The chain transfer agent is selected from the family of mercaptans, and particularly: glycoldimercaptoacetate, n-butyl mercaptan, or lauryl mercaptan, in concentrations of between 0.01 and 0.05 mole/liter. This range of concentration is sufficiently high to maintain a good effectiveness of the agent and permit obtaining a molecular mass of the above-defined values, but sufficiently low in order to not reduce the quantitative yield of the material.

The invention also relates, with respect to a new product, to scintillating optical fibers obtained by carrying out the process. These fibers comprise a core of a polymer having aromatic rings containing doping molecules having a Stokes shift, and a peripheral sheath with an index of refraction less than that of the core material, and are characterized in that:

the core polymer has a molecular mass of between 80,000 and 600,000, the doping molecules are comprised of 1-phenyl-3-mesityl-2-pyrazoline (PMP) in such a manner that the fiber is able to directly transform an energy of excitation from $\alpha$, $\beta$ or $\gamma$ into visible light, and to transmit and guide the latter.

The description which follows in reference to the accompanying drawings describes three examples of embodiments of the process of the invention which illustrate and explain the performances of the fibers obtained. In these drawings:

FIG. 1 is a comparative diagram providing the molar extinction coefficients of the materials obtained in each of the examples (curves A, B, C) compared to the molar extinction coefficient of a known material (curve D);

FIGS. 2a and 2b show in a comparative manner the adsorption/emission diagrams in the case of the invention (FIG. 2a) and the known material (FIG. 2b);

EXAMPLE 1

Figure 3A:
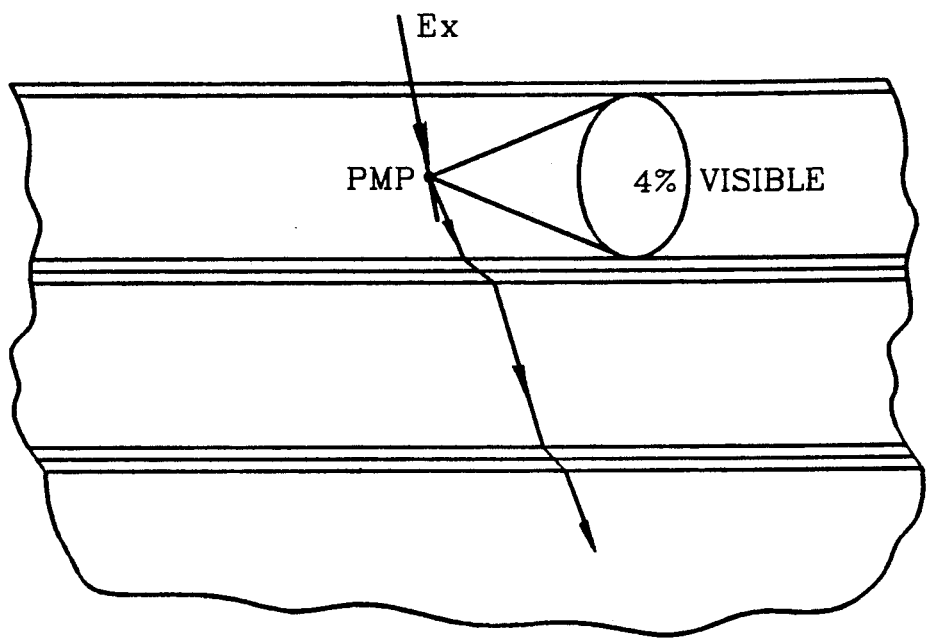
FIGS. 3a and 3b illustrate the scintillation phenomena, in the case of fibers conforming to the invention (FIG. 3a) and in the case of conventional fibers, assumed to be of the same diameter.

The present example provides for the production of fibers from a monomer constituted by vinyltoluene, doped by means of PMP. As is known, PMP is characterized by a Stokes shift corresponding to an adsorption peak at 295 nm and an emission peak at 410 nm (these peaks being measured, as is known, in a solution of cyclohexane).

This aromatic monomer is present in the form of a transparent liquid on which is carried out a preliminary drying step in order to reduce its degree of humidity to a value less than 10 ppm.

In the example, this desiccation is achieved in the following manner:

600 cm$^3$ of vinyltoluene is allowed to flow by gravity through a bed of silica gel, then through a bed of basic alumina in a 1000 cm$^3$ round bottom flask. The flask is provided with a column of 15 mm diameter and 40 cm height, provided with a double wall under vacuum. The column is filled with glass helices and provided with a distillation head. This same head is provided with a stopcock which permits withdrawal of the fraction from the head of the distillate. The intermediate fraction is recovered in a second flask of 500 cm$^3$, itself provided with a second column and a second distillation head. The double distillation is carried out under primary vacuum for lowering the working temperature to 50° C. 100 cm$^3$ of the fraction is removed from the head.

The thus purified and dried monomer is mixed with PMP, a transfer agent (preliminarily purified by distillation) comprised of GDMA (glycoldimercapto acetate) and an antioxidant comprised of $\alpha$-phenylnaphthylamine. To this end, an intermediate fraction of 200 cm$^3$ of monomer is transferred into a cylindrical glass ampule containing the predetermined quantities of PMP, GDMA and $\alpha$-phenylnaphtylamine. These quantities are calculated for obtaining a concentration of 0.05 mole/liter of PMP, 0.017 mole of transfer agent per liter, and 0.5 g/l of antioxidizing agent.

The transfer is carried out under vacuum without contact with the atmosphere in order to avoid any contamination of the products. The mixture thus obtained is degassified by successive cycles of freezing, high vacuum treatment, and thawing, until bubbles no longer appear during the thawing.

The glass tube is next sealed under vacuum and then placed in a thermostatically controlled oil bath for causing the polymerization of the mixture. The temperature is held at a constant value of 95° C. for 45 hours. It is then gradually increased to 140° C. and held at this temperature for 24 hours. Finally it is progressively lowered to ambient temperature at several cooling rates:

from 140° C. to 120° C. at 0.1° C./minute,
from 120° C. to 110° C. at 0.05° C./minute
from 110° C. to 90° C. at 0.03° C./minute (glass transition temperature=100° C.),
from 90° C. to ambient temperature at 0.5° C./minute.

The glass tube is then cut open in its upper part and the polymer is withdrawn.

The bar obtained is centered in a glass ampule of a greater diameter and a sheath monomer comprising trifluoroethyl methacrylate containing a photosensitizing agent is poured around the bar. The assembly is cooled to 5° C. and subject to photopolymerization by means of a circular bank of ultraviolet lamps. The composite is then withdrawn from the ampule and placed in a stove at 80° C. for 24 hours to complete the polymerization of the sheath.

Then, the preform is placed is a fiber drawing machine and heated locally to 190° C. in the drawn section. The speed of drawing is determined as a function of the desired diameter. The molecular mass of the core polymer on the order of 150,000 permits drawing without difficulty.

EXAMPLE 2

The same procedure is used for providing a concentration of PMP equal to 0.025 mole per liter of the core monomer, the other parameters remaining identical.

EXAMPLE 3

The same procedure is used while using styrene as a core monomer under identical operative conditions to those of Example 1, with the following exception: the temperature of the first stage of polymerization is adjusted to 105° C. (instead of 95° C.).

The drawings illustrate the performance which the process of the invention provides.

Curves A, B, C of FIG. 1 give for examples 1, 2 and 3 respectively, the molar extinction coefficients in liter/mole.cm as a function of the wavelength in nanometer in the region of emission wavelengths of PMP.

Curve D of FIG. 1 is a similar curve for a known scintillating material produced by the "Nuclear Enterprise" Company and designated by the reference "NE110". This material is constituted by vinyltoluene doped by means of two products: a capture dopant $D_1$ and a shift dopant $D_2$ (of types already mentioned) which work in series.

The molar extinction coefficient of the materials produced by the process of the invention is largely 100 times weaker than that of the known material, such that the intrinsic lengths of attenuation are much higher in the case of the invention.

FIGS. 2a and 2b, permit explanation of the different functions of the two materials;

the material according to the invention with a single dopant PMP (FIG. 2a), the conventional material with two dopants $D_1$ and $D_2$ (FIG. 2b).

In these figures have been shown the absorption and emission spectra of the one or more dopants in the two cases (assumed to be measured in cyclohexane solution). The absorption spectra are expressed on the ordinate in $10^4$ l/mole.cm and the emission spectra in arbitrary unit (standardized to obtain peaks of the same amplitude).

The PMP absorbs in the emission region of the polymer (peak $P_1$, FIGS. 2a), which permits a good energy transfer between the exciting radiation ($\alpha$, $\beta$, $\gamma$) and the dopant through the intermediary of said polymer (it should be noted that the transfer/dopant is not radiating). The PMP re-emits visible light near 410 nm (peak $P_2$), the wavelength corresponding to a good transparency of the polymer and a maximum sensitivity of the photocathodes which are called upon to be arranged at the end of the fiber for the detection of conducted light.

The absorption and emission spectra of PMP only show a very slight overlap such that the auto-absorption of this material is very slight, thus the possibility of use in strong concentrations given previously (up to 0.2 mole per liter of monomer).

By contrast, for the known material (FIG. 2b), the shift of wavelength from the emission region of the polymer to the wavelength of visible light is assured in a completely different manner by the two dopants working in series:

the capture dopant $D_1$ absorbs in the emission region of the polymer (peak $P_3$) and re-emits at an intermediate wavelength (peak $P_4$), the shift dopant $D_2$ absorbs the light emitted by $D_1$ at this intermediate wavelength (peak $P_5$) and re-emits in the visible region (peak $P_6$).

This working in a chain is very penalizing as will be understood below in the case of small diameter fibers; moreover, the peaks $P_5$ and $P_6$ have an important recovery zone, which leads to an autoabsorption of the shift dopant, which limits the useful concentration (thus increasing the free distance covered by the intermediate photons).

FIG. 3a shows schematically on an enlarged scale a bundle of fibers according to the invention. The dopant emits the light in an isotropic manner and the conditions of total reflection at the core/sheath interface causes about 4% of the light to be guided in each direction of the fiber along its longitudinal direction. This percentage is compatible with the sensitivity of conventional photoconductors placed at the end of the fiber. This is true regardless of the size of the fiber.

It is emphasized that in the process of energy exchange carried out in the fiber according to the invention, no ultraviolet light appears. The non-conducted light which is emitted by the PMP dopant under the effect of the exciting radiation Ex is characterized by a visible wavelength which traverses adjacent fibers without being reabsorbed by the doping molecules of these fibers (by reason of the fact of a single dopant and non-recovery of its peaks $P_1$ and $P_2$). Thus, there is no parasitic scintillation of a fiber non directly achieved by the exciting radiation which is sought to be localized.

Figure 3B:
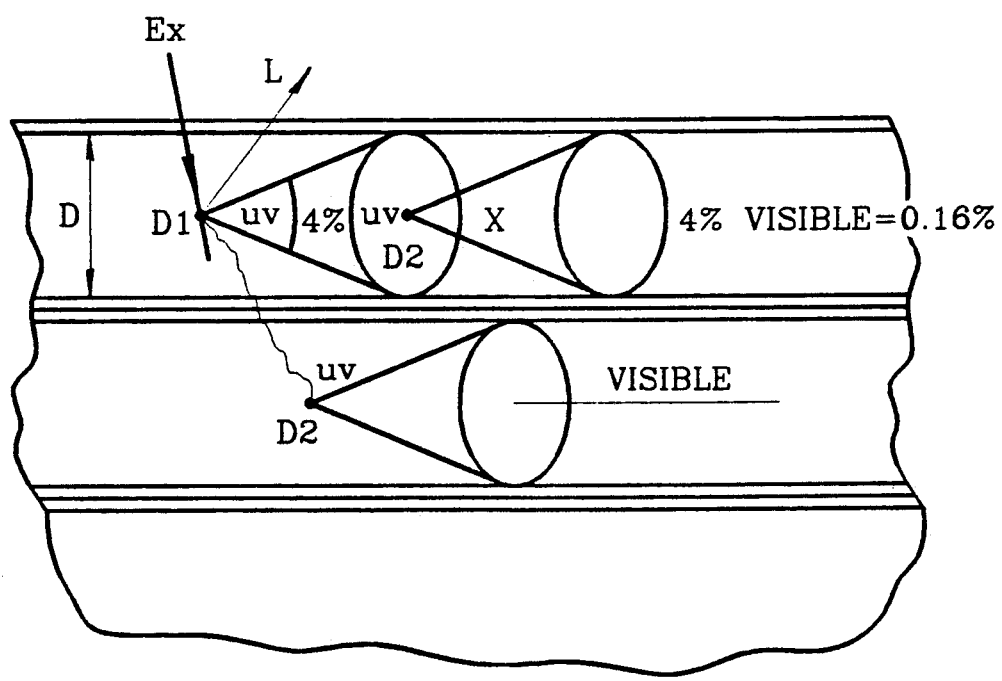

By way of comparison, FIG. 3b relates to a bundle of conventional fibers with two dopants in series: this figure illustrates under the same conditions of diameter of the fiber that, in this case, only 4%×4%=0.16 % of the light is conducted in each direction during the free travel L of the intermediate photons is great with respect to the diameter of the fiber. In the usual range of concentration permitted by the shift dopants $D_2$ ($5.10^{-4}$ mole/l), this free travel is on the order of 400 to 500 microns. This is one of the limiting factors which causes an obstacle to the reduction of the diameter of the fibers below this value in the known process.

Further, the intermediate non-conducted photons which are emitted by the capture dopant $D_1$ are of a wavelength on the order of 350 nm (peak $P_4$); they are propagated toward adjacent fibers where they are reabsorbed by the shift dopant (peak $P_5$) and reemitted in the form of parasitic visible light in a non-excited fiber. It is therefor necessary to provide around each of these known fibers a supplemental sheath, opaque to these intermediate photons.

We claim:

1. A process for the production of scintillating optical fibers of the type comprising using a core monomer having aromatic rings, in particular vinyltoluene or styrene, dissolving in said monomer doping molecules having a Stokes shift, heating the mixture for causing it to polymerize for producing a core polymer and carrying out an operation of depositing on the surface a sheath material having an index of refraction less than that of the core polymer and a drawing operation of said polymer for producing the optical fiber, said process being characterized in dissolving in the core monomer doping molecules of 1-phenyl-3-mesityl-2-phrazoline (PMP) having a Stokes shift characteristic of an absorption of ultraviolet light with a peak at 295 nm (measured in cyclohexane solution), said dissolution being carried out to obtain a mixture of a concentration comprising between 0.005 and 0.2 mole of PMP per liter of monomer, carrying out the polymerization of the mixture so as to limit the molecular mass of the core polymer to values comprising between 80,000 and 600,000.

2. A production process as in claim 1, characterized in dissolving the PMP in the core monomer for obtaining a mixture of a concentration comprising between 0.01 and 0.05 mole of PMP per liter of monomer.

3. A production process as in claim 2, characterized in heating the mixture in two steps, initially to a first stage of between 90° C. and 110° C. for a period of time adapted to achieve a degree of polymerization at least equal to 80%, then to a second stage situated between 130° C. and 150° C. to obtain a degree of polymerization greater than 99.5%.

4. A production process as in claim 1, characterized in:

causing the mixture to polymerize in a cylindrical ampule for obtaining a bar after polymerization, cooling said bar at a speed of cooling less than 0.15° C./minute to ambient temperature, carrying out the drawing operation after reheating the bar to softening.

5. A production process as in claim 4, characterized in that the cooling is carried out in several steps having rates of cooling decreasing in relation to the proximity to the glass transition temperature of the core polymer, the speed of cooling for passing this temperature being less than 0.05° C./minute.

6. A production process as in claim 4 in which a sheath material constituted by a fluorinated acrylic sheath monomer is used, arranging said sheath monomer on the surface of the bar of core polymer, causing said sheath monomer to polymerize about said bar and reheating the composite before drawing.

7. A production process as in claim 1 in which an antioxidant product is added to the core monomer or to the mixture for limiting the oxidation phenomena of the core polymer and of the PMP.

8. A production process as in claim 1 in which a chain transfer agent of the following group is used: glycoldimercapto acetate, n-butyl mercaptan, or lauryl mercaptan, at a concentration of between 0.01 and 0.05 mole/liter.

9. A production process as in claim 1, in which a preliminary drying is carried out on the core monomer or the mixture, for reducing the degree of humidity to a value less than 10 ppm.

10. A production process as in claim 1, characterized in carrying out a degassing of the mixture before polymerization by successive cycles of freezing/primary vacuum/thawing.

11. A scintillating optical fiber comprising a core of a polymer of aromatic rings having doping molecules having a Stokes shift, and a peripheral sheath of an index of refraction less than that of the core, characterized in that:

the core polymer has a molecular mass between 80,000 and 600,000, the doping molecules constitute 1-phenyl-3-mesityl-2-pyrazoline (PMP) such that the fiber is able to directly transform an excitation energy of $\alpha$, $\beta$ or $\gamma$ radiation into visible light, and to retransmit and conduct the latter.

12. A scintillating optical fiber as in claim 11 in which the core contains an antioxidant product.

* * * * *